Aug. 20, 1968  A. S. JOHNSON  3,397,588

DRIVE FOR A TAPPING ATTACHMENT

Filed March 21, 1966

INVENTOR.
ALLAN S. JOHNSON
BY
Herzig, Walsh & Blackham
ATTORNEYS

United States Patent Office 3,397,588
Patented Aug. 20, 1968

3,397,588
DRIVE FOR A TAPPING ATTACHMENT
Allan S. Johnson, 845 W. 16th St.,
Costa Mesa, Calif. 92627
Continuation-in-part of application Ser. No. 426,966,
Jan. 21, 1965. This application Mar. 21, 1966, Ser.
No. 535,756
3 Claims. (Cl. 74—376)

ABSTRACT OF THE DISCLOSURE

A drive device for tapping attachments which does away with the chattering encountered when releasing the clutch by providing that the input element of the clutch is allowed to move axially against a spring bias.

---

This application is a continuation-in-part of application Ser. No. 426,966 filed Jan. 21, 1965, now abandoned, which shows a disc type of clutch for transmitting torque in direct drive.

This invention relates to thread cutting or tapping attachments for use with drilling machines, lathes and boring machines in association with the spindle of the machine.

The invention is an improvement in tapping attachments, one type of which is illustrated in prior Patent No. 3,041,893 of Allan S. Johnson. The improvements of this invention lie primarily in the improvement of the means for transmitting torque from the drive to the driven spindle of the attachment, as well as in certain other features as made clear hereinafter. The exemplary form of the attachment, described herein, is of the type having free axial float, as described in the previous patent. The invention may be embodied in attachments providing for either direct drive only or reverse drive, as well. In the exemplary form of the attachment shown herein, the reverse drive is provided by way of a planetary gear arrangement.

In regard to the direct drive as well as the reverse drive of tapping attachments it has been customary to employ radial drive pins cooperating with axial splines on a concentric element. These elements form a clutch for engaging and disengaging both the direct and reverse drive mechanism. To disengage the direct drive, the attachment is raised until the drive pins (attached to the driven spindle) reach the bottom of the splines. When a pin reaches the bottom of the spline and is about centered with it, it tries to move under it while the spline tries to ride over the pin producing chattering. Normally, the pins are round and the splines square so the tendency is to wear the edge or corner off the square spline which increases the chattering and wear often resulting in a failure. The present invention overcomes this deficiency and to do so is a primary object of the invention. This is accomplished by the inclusion in the combination of a spring driver cup. In the exemplary form of the invention this element is movable axially against a biasing spring. The driving torque is transmitted through it. The splines, or the surfaces which the driving pins engage are formed in the spring driver cup. The result is that when the driving pins reach the end of the splines or comparable surfaces on the spring driver cup it can move axially effecting immediate release and thereby completely eliminating the disadvantages described above.

From the foregoing preliminary references to the invention it may be understood that the primary object of the invention is to improve and make more effective and practical the transmission of the torque to the driven member or spindle, and particularly to eliminate the deficiency described which resulted in chattering, wear, and failures.

Another object is to accomplish the foregoing in a simplified but effective way, particularly as exemplified in the spring driver cup element which is movable axially, relatively, for effecting release as described.

Further objects and additional advantages of the invention will become apparent from the following detailed description and annexed drawings, wherein.

Figure 1:
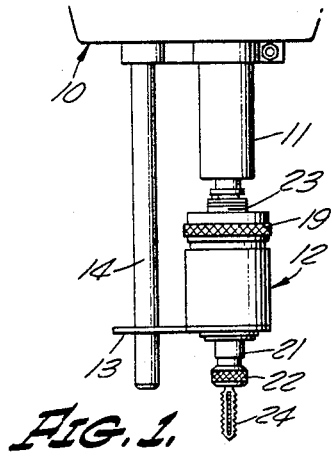
FIGURE 1 is a view of a preferred form of the tapping attachment mounted on a driving tool or machine.

Referring now, more in detail to FIGURE 1 to 5 of the drawings, numeral 10 designates a machine tool with which the attachment may be used. It has a spindle 11 and the tapping attachment of the invention is designated generally at 12. Numeral 13 designates a stop rod which is held against rotation as will be described hereinafter by a vertical column 14 which is attached at the upper end to the machine 10 as shown.

The tapping attachment comprises a generally cylindrical housing 17 having an extending threaded upper part 23 and on which is a knurled adjusting cap 19. As will be described, a means in the form of a clutch is provided for limiting the torque that is applied to the tap while working so that the clutch will slip in the event of an overload. The cap 19 is a clutch adjusting cap. Numeral 21 designates the driver spindle carrying tap chuck nut 22 which holds the tap 24. See FIGURE 1. The tap chuck nut 22 and tap 24 are conventional and may be like those shown in the earlier application and patent referred to.

Figure 2:
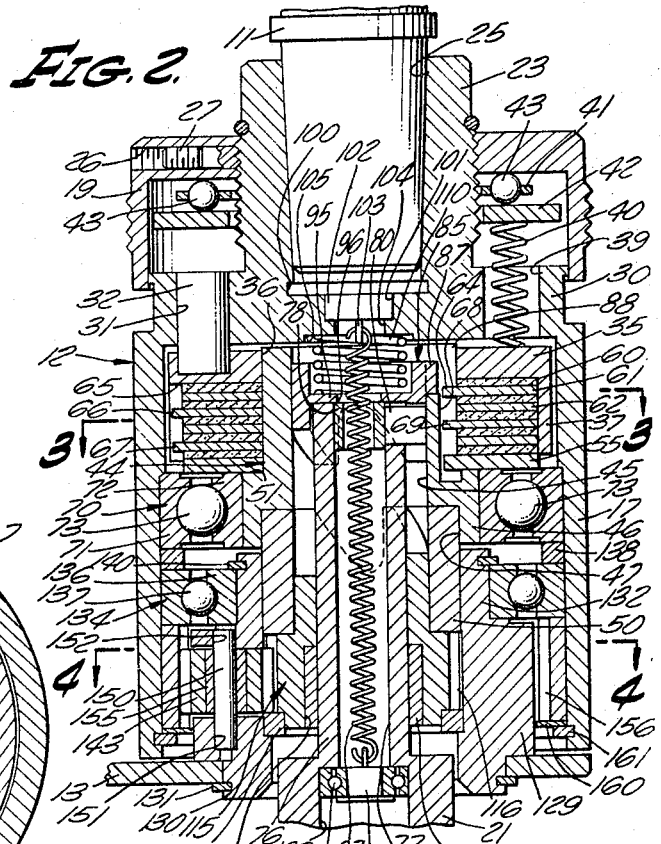
FIGURE 2 is a cross-sectional view of the tapping attachment of FIGURE 1.

FIGURE 2 shows the attachment 12 in cross-section. The attachment has a cylindrical body 17 having an upwardly extending part 23 having external threads. The lower part is cylindrical and hollow as shown. The part 23 has a tapered bore 25 in which is received the end of the drive stem or spindle 11. The cap 19 is externally knurled as described and threads onto the part 23. The cap 19 has a radial bore 26 which is threaded to receive the lock set screw 27. The cap 19 cooperates with the clutch mechanism as will be described, for adjusting the amount of torque that can be transmitted, as will be described.

The intermediate part of the body 23 as designated at 30 has three angularly spaced axial bores as shown at 31 in which are received pins 32 which extend into and drive the clutch driver member 35 which is a circular member having a central bore 36 and a depending skirt 37. The part 30 of body 23 has three additional bores 39 and in these bores are coil springs as designated at 40. One end of these springs seats on the clutch driver member 35 and the other ends seat on the spring plate 42 in the cap 19. A thrust bearing is interposed between spring plate 42 and the inside surface of the top of cap 19. This thrust bearing comprises ball ring 41 having openings with balls 43 in them.

Numeral 44 designates the clutch sleeve. This part is cylindrical having a bore 45. It has an enlarged lower part 46 having a counterbore 47 in which is received the upper end of the reversing sleeve bushing 50. The enlarged part of clutch sleeve 44 forms a square shoulder 51 and on this shoulder rests the primary internal clutch plate ring 55. The clutch elements are disposed between the clutch driver 35 and the primary internal clutch plate ring 55. The clutch comprises alternating fiber disc plates 60 and metal discs 61 and 62. The depending skirt 37 has slots shown at 65 in which are received projections 66 and 67 extending from certain of the metal disc plates so as to drive these plates. The upper part of the clutch sleeve 44 has external axial slots as shown at 68, 68' and 68" in which are received projections as shown at 64 and 69 extending from alternate metal plates so that these plates can drive the clutch sleeve 44. The metal disc plates are rotated by frictional engagement with the fiber disc plates and in this manner the clutch sleeve is driven. The frictional engagement between the plates depends upon the adjustment of the cap 19 and the force thereby exerted through the springs 40.

The disc clutch rests on internal clutch plate ring 55 over bearing 70, which has an outer ball race 71, an inner ball race 72 and interposed balls 73, this bearing being within the body 17. Clutch sleeve 44 rotates in this bearing for direct drive.

Numeral 76 designates the driven spindle which is cylindrical having a central bore 77. Within its upper end is a bushing 78 and at its upper end are three radially extending drive pins as designated at 80, 81 and 82 in FIGURE 3. These pins extend outwardly through radial bores in spindle 76. The driven spindle 76 is axially shiftable relatively, to change from direct to reverse drive, as will be described.

Figure 3:
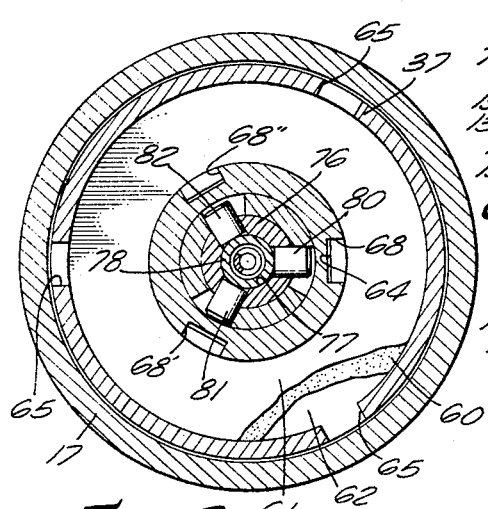
FIGURE 3 is a sectional view taken along the line 3—3 of FIGURE 2.
Figure 5:
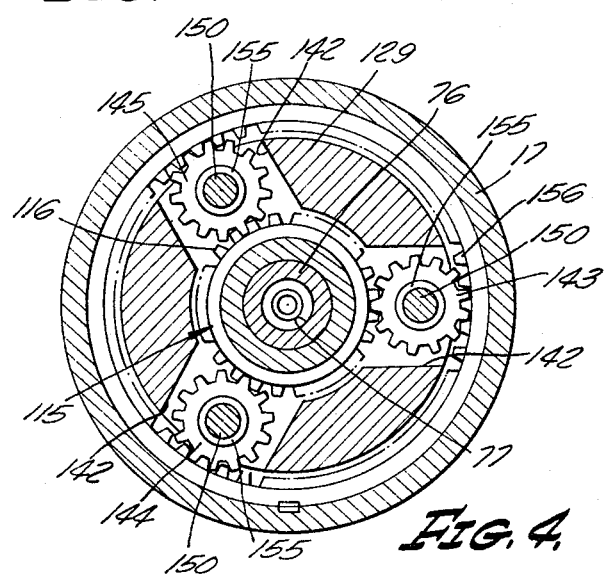
FIGURE 5 is a detail view of the spring driver cup and the reversing sleeve.

The ends of the drive pins 80, 81, and 82 are engageable with openings or cut-outs in the spring driver cup 85 shown in FIGURE 5. The spring driver cup is generally cylindrical, but has at the upper part thereof straight sided angularly spaced lugs 87. These lugs fit into similarly spaced axial slots formed internally in the upper part of the clutch sleeve 44 as designated at 88 in FIGURE 2. Thus, the spring driver cup 85 rotates with the clutch sleeve 44, but may move axially relative thereto. The spring driver cup 85 has a downwardly extending skirt having openings in it of which there are three, each being shaped to provide one generally axial edge as shown at 91 and a generally helical edge as shown at 92 for purposes which will presently be described. Within the spring driver cup 85 is a transverse web 95 having a central opening 96 to accommodate the tap return spring 97, which will be described more in detail presently. FIGURE 3 shows the relationship between the drive pins 80, 81, and 82; the spring driver cup 85 and the clutch sleeve 44.

Near the bottom of the tapered bore 25 in the part 23 is a cylindrical bore 100 and a counter bore 101 in which is a spring hanger member 102. On the bottom of the spring hanger member is a hook 103 to which is attached the upper end of the tap return spring 97. Below the counter bore 101 is a further counter bore 104 and a still further short counter bore 105. Numeral 110 designates a cushion spring, one end of which is received in the counter bore 105 and the other end of which engages the web 95 in the spring driver cup 85. The spring forms a biasing spring permitting axial movement of the spring driver cup 85 for purposes of releasing the drive pins 80, 81 and 82 from direct drive engagement. This operation will be described more in detail presently in connection with the direct drive clutching and declutching operation.

Figure 4:
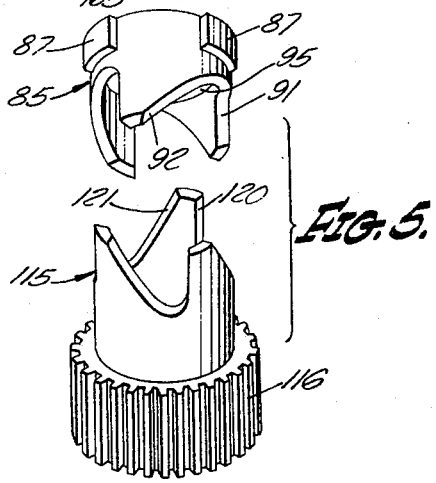
FIGURE 4 is a sectional view taken along the line 4—4 of FIGURE 2.

Numeral 115 in FIGURE 5 designates the reversing sleeve which carries the reverse drive gear 116. The reversing sleeve 115 is fitted on to the driven spindle 76 to drive it. Its lower end rests on thrust washer 117. Its upper part fits within the reverse sleeve bushing 50. At its upper end it has openings or cut-outs providing a configuration which is the reverse of the configuration on the spring driver cup 85. The openings or cut-outs in the sleeve 115 provide axial surfaces as shown at 120 and adjacent generally helical surfaces 121 which cooperate with the driver pins 80, 81, and 82 in a manner that will be described presently. The gear 116 is driven by a planetary gear mechanism as will be described. The driven spindle 76 rotates within drive spindle bearing 125 which is within the lower part of the reversing sleeve 115 in a counterbore 126. Numeral 129 designates the gear carrier of the planetary gear train which is secured at the lower part thereof to the stop arm 13, the gear carrier having a part 130 at the bottom of smaller diameter and this part extends through the stop arm 13 and is secured by a Truarc ring 131. The upper part of the gear carrier 129 is of smaller diameter as shown at 132, and it rotates within a ballbearing 134 comprising an outer ball race 135, an inner ball race 136 and a set of balls as designated at 137, the ballbearing being held in place by a Truarc ring 140. This bearing is spaced from bearing 70 by spacer ring 138. The gear carrier has a group of spaces or openings in it as shown at 142 in FIGURE 4 in which are positioned the planetary gears 143, 144, and 145. Each of these gears as shown is mounted on a pin as shown at 150. These pins are mounted in the gear carrier 129. As shown in FIGURE 4, the lower end of the pin 150 is mounted in a bore 151 in a part of the gear carrier 129 and the upper end of this pin is mounted in a similar upper bore 152 in the gear carrier 129. Each of the pins 150 rotates in a planet bearing or bushing as designated at 155, made of suitable bearing material such as oil impregnated bronze. The planet gears are similarly mounted as described and they mesh with the ring gear 156 which fits within the inside of the cylindrical housing 17 as shown. Numeral 160 designates a gear washer below the ring gear 156 and below this washer is a Truarc ring 161.

The driven spindle 76 at the end of the bore 77 has a counter bore 163 and in this counter bore is a spring bearing hanger 164 within a spring bearing 165 mounted in the counter bore. The spring bearing hanger 164 holds the end of the spring 97. The end part of the driven spindle is enlarged as shown and includes the chuck nut 22 and tap 24 as shown in FIGURE 1.

The operation of the attachment is as follows:

When the operator is operating the tapping attachment and lowers it for tapping, a stop is usually set on the machine being used to fix the lowest point to which the attachment can be moved by itself tapping into the hole and moving downwardly. The tap holding spindle has the characteristic of free axial float and permits the tap to follow its own lead. It is not necessary that the operator apply any lead pressure on the tap once the tap is engaged in the work piece and cutting a thread during the tapping operation. The operator merely moves the machine spindle behind the lead of the tap until the desired depth is reached. A short quick upward movement of the machine spindle will instantly reverse the tap at any time. The tap will return to a right handed rotation as soon as it is withdrawn from the hole. The spring loaded clutch will slip when the tap reaches the bottom in blindhole tapping.

Torque is transmitted to the clutch and the amount transmitted is limited by the setting of the clutch as determined by the adjustment of cap 19. The axial thrust of the clutch is taken by the thrust bearing comprising the ring 41 and balls 43. The metal disc plates and fiber disc plates of the disc clutch engage each other as described and transmit the torque efficiently and effectively but without any noise and also permitting a fine degree of adjustment of the limiting torque. In direct drive, the drive is transmitted to clutch sleeve 44 from the clutch discs as described. The clutch sleeve 44 of course transmits the torque to the spring cup driver 85 which rotates with it. The drive pins 80, 81 and 82 in the direct drive position extend into the cut-outs in the spring cup driver 85 as described and engage against the axial surfaces 91. In this manner the spring cup driver 85, through the drive pins, transmits torque to the driven spindle 76. This provides for a direct drive. As pointed out the driven spindle 76 has free axial float being suspended by the spring 115.

In the reversing operation a short quick upward movement is given to the machine spindle which raises the attachment 12 relative to the driven spindle 76. The drive pins 80, 81 and 82 are now disengaged from the axial surfaces 91 of the spring cup driver 85, and they are brought into the cut-outs or openings in the reverse drive sleeve 115 and they come into an engagement with the axial surfaces 121. The attachment will now operate in reverse drive.

The spring cup driver 85 has a very important function in the operation. Its purpose is to overcome certain disadvantages in prior devices as described heretofore. When the lower edges of the spring cup driver 85 reach the drive pins 80, 81, and 82, instead of the chattering that previously took place, release is immediately effected because the spring cup driver 85 can move upwardly against its biasing spring 110. Upon further upward movement, the spring cup driver 85 assumes its normal axial position. When the attachment is returned from reverse to direct drive, the gradual or generally helical surfaces 92 facilitate the drive pins 80, 81, and 82 coming into engagement with the axial surfaces 91. A similar result is realized when the drive pins 80, 81, and 82 come into engagement with the reversing sleeve 115 for reverse drive, the surfaces 121 facilitating the drive pins coming into engagement with the axial surfaces 120.

In the reverse drive position the reversing sleeve and gear 116 are engaged with the driven spindle 76 by way of the drive pins 80, 81, and 82. The drive now goes directly through the housing 17 and the ring gear 156 which drives the planetary gears 143, 144, and 145 on their center pins, these gears being of course held in a fixed position by the gear carrier 129, which is held from rotation by the stop arm 13. The drive is through the ring gear 156 and the planetary gears to the gear 116 on the reversing sleeve 115, which through the drive pins 80, 81, and 82 drives the driven spindle 76 in reverse direction.

From the foregoing those skilled in the art will observe that the invention achieves and realizes all of the objects and advantages that are set out in the foregoing, as well as having many additional advantages that are apparent from the detiled description herein. The exemplary embodiment described herein is a relatively large size of the device in which a thrust bearing is incorporated in the clutch housing. In smaller sizes where the axial thrust may be less, this bearing may be omitted. Also, in the smaller sizes the lower bearing 134 may be omitted.

The foregoing disclosure is representative of a preferred form of the invention and is to be interpreted in an illustrative rather than a limiting sense, the invention to be accorded the full scope of the claims appended hereto.

What is claimed is:

1. In a coupling means for transmitting torque from a first rotating member to a second axially aligned rotating member, means comprising an element carried by one of said members and axially movable relative thereto, a second element carried by the other member engageable by said first element for transmitting torque from one member to the other, means biasing axial movement of said first element, said members being axially movable relative to each other for disengaging the torque transmitting means, whereby upon relative axial movement of said members, when said first and second elements are disengaging from each other said first element is moved axially relative to said one member against said biasing means to effect disengagement without chattering of the transmitting means, said first element being shaped to provide an axially extending surface, said second element extending radially to engage said surface.

2. In a coupling means for transmitting torque from a first rotating member to a second axially aligned rotating member, means comprising an element carried by one of said members and axially movable relative thereto, a second element carried by the other member engageable by said first element for transmitting torque from one member to the other, means biasing axial movement of said first element, said members being axially movable relative to each other for disengaging the torque transmitting means, whereby upon relative axial movement of said members, when said first and second elements are disengaging from each other said first element is moved axially relative to said one member against said biasing means to effect disengagement without chattering of the transmitting means, said first element being in the form of a sleeve provided with a surface engageable with said second element for transmitting torque to it, said sleeve comprising a skirt portion having at least one cut-out therein and said second element comprising a radial pin engageable in said cut-out.

3. In a coupling means for transmitting torque from a first rotating member to a second axially aligned rotating member, means comprising an element carried by one of said members and axially movable relative thereto, a second element carried by the other member engageable by said first element for transmitting torque from one member to the other, means biasing axial movement of said first element, said members being axially movable relative to each other for disengaging the torque transmitting means, whereby upon relative axial movement of said members, when said first and second elements are disengaging from each other said first element is moved axially relative to said one member against said biasing means to effect disengagement without chattering of the transmitting means, one of said members being a first driving member and the other being the driven member, a second driving member which is a reverse driving member and which is co-axial with the first driving member, a reversing power train for driving said second driving member from said first rotating member, said second driving member having means engageable with said second element upon relative axial movement thereof for transmitting reverse drive to the driven member.

References Cited
UNITED STATES PATENTS

| | | | |
|---|---|---|---|
| 910,456 | 1/1909 | Brush | 192—48 |
| 984,523 | 2/1911 | Baer | 192—41 |
| 1,488,684 | 4/1924 | Kassler | 192—48 |
| 2,390,792 | 12/1945 | Jespersen | 192—67 |
| 3,144,783 | 8/1964 | Dubendorfer | 74—205 X |
| 1,435,903 | 11/1922 | Holmes | 192—51 |
| 3,214,773 | 11/1965 | Benjamin et al. | 10—135 |

FRED C. MATTERN, Jr., *Primary Examiner.*

T. C. PERRY, *Assistant Examiner.*